(12) United States Patent
Kuroda

(10) Patent No.: US 9,020,409 B2
(45) Date of Patent: Apr. 28, 2015

(54) BELT UNIT, FIXING DEVICE AND IMAGE FORMING APPARATUS

(71) Applicant: Oki Data Corporation, Tokyo (JP)

(72) Inventor: Teruaki Kuroda, Tokyo (JP)

(73) Assignee: Oki Data Corporation, Tokyo (JP)

( * ) Notice: Subject to any disclaimer, the term of this patent is extended or adjusted under 35 U.S.C. 154(b) by 65 days.

(21) Appl. No.: 13/690,855

(22) Filed: Nov. 30, 2012

(65) Prior Publication Data

US 2013/0170878 A1 Jul. 4, 2013

(30) Foreign Application Priority Data

Dec. 28, 2011 (JP) .................. 2011-288419

(51) Int. Cl.
*G03G 15/20* (2006.01)
*B65G 15/60* (2006.01)
*B65G 15/00* (2006.01)

(52) U.S. Cl.
CPC ............ *G03G 15/2085* (2013.01); *B65G 15/60* (2013.01); *G03G 15/2053* (2013.01); *G03G 2215/2029* (2013.01); *G03G 2215/2041* (2013.01); *G03G 2215/00143* (2013.01); *G03G 15/2028* (2013.01)

(58) Field of Classification Search
CPC .......... G03G 15/2085; G03G 15/2017; G03G 15/2053; B65G 15/32
See application file for complete search history.

(56) References Cited

U.S. PATENT DOCUMENTS

| 7,020,423 | B2 * | 3/2006 | Ono et al. ...................... 399/329 |
| 7,233,764 | B2 * | 6/2007 | Naito et al. ................... 399/329 |
| 2009/0014289 | A1 * | 1/2009 | Walter ........................... 198/847 |
| 2011/0299904 | A1 * | 12/2011 | Oishi et al. ..................... 399/329 |

FOREIGN PATENT DOCUMENTS

| JP | 2005-292548 | * | 10/2005 | ............. G03G 15/20 |
| JP | 2005-326625 A | | 11/2005 | |
| JP | 2006-078612 A | | 3/2006 | |
| JP | 2006-317773 A | | 11/2006 | |
| JP | 2008-185855 A | | 8/2008 | |
| JP | 2011-170051 | * | 9/2011 | ............. G03G 15/20 |

OTHER PUBLICATIONS

English machine translation of JP-2005-292548.*
English machine translation of JP-2011-170051.*

* cited by examiner

*Primary Examiner* — Billy Lactaoen
*Assistant Examiner* — Arelene Heredia Ocasio
(74) *Attorney, Agent, or Firm* — Rabin & Berdo, P.C.

(57) ABSTRACT

A belt unit includes an endless belt member, a first roller provided on an inner circumferential surface side of the belt member, and a stretching member provided on the inner circumferential surface side of the belt member. The stretching member is configured to stretch the belt member. A circumferential length of the belt member at a center portion in a widthwise direction of the belt member is shorter than a circumferential length of the belt member at an end portion in the widthwise direction of the belt member.

17 Claims, 12 Drawing Sheets

BELT UNIT, FIXING DEVICE AND IMAGE FORMING APPARATUS

BACKGROUND OF THE INVENTION

The present invention relates to a belt unit and a fixing device, and relates to an image forming apparatus such as an electrophotographic printer.

A belt unit having an endless belt member is conventionally known. Such a belt unit is disclosed in, for example, Japanese Laid-open Patent Publication No. 2006-78612.

In this regard, there has been a demand for stabilizing a movement of the belt member.

SUMMARY OF THE INVENTION

An aspect of the present invention is intended to provide a belt unit, a fixing device and an image forming apparatus capable of stabilizing a movement of a belt member.

According to an aspect of the present invention, there is provided a belt unit including an endless belt member, a first roller provided on an inner circumferential surface side of the belt member, and a stretching member provided on the inner circumferential surface side of the belt member. The stretching member is configured to stretch the belt member. A circumferential length of the belt member at a center portion in a widthwise direction of the belt member is shorter than a circumferential length of the belt member at an end portion in the widthwise direction of the belt member.

With such a configuration, a movement of the belt member can be stabilized.

Further scope of applicability of the present invention will become apparent from the detailed description given hereinafter. However, it should be understood that the detailed description and specific embodiments, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENT

Hereinafter, embodiments of the present invention will be described with reference to drawings. The drawings are provided for illustrative purpose and are not intended to limit the scope of the present invention.

First Embodiment.

A belt unit, a fixing device and an image forming apparatus according to the first embodiment of the present invention will be described.

<<Configuration of First Embodiment>>

Figure 1:
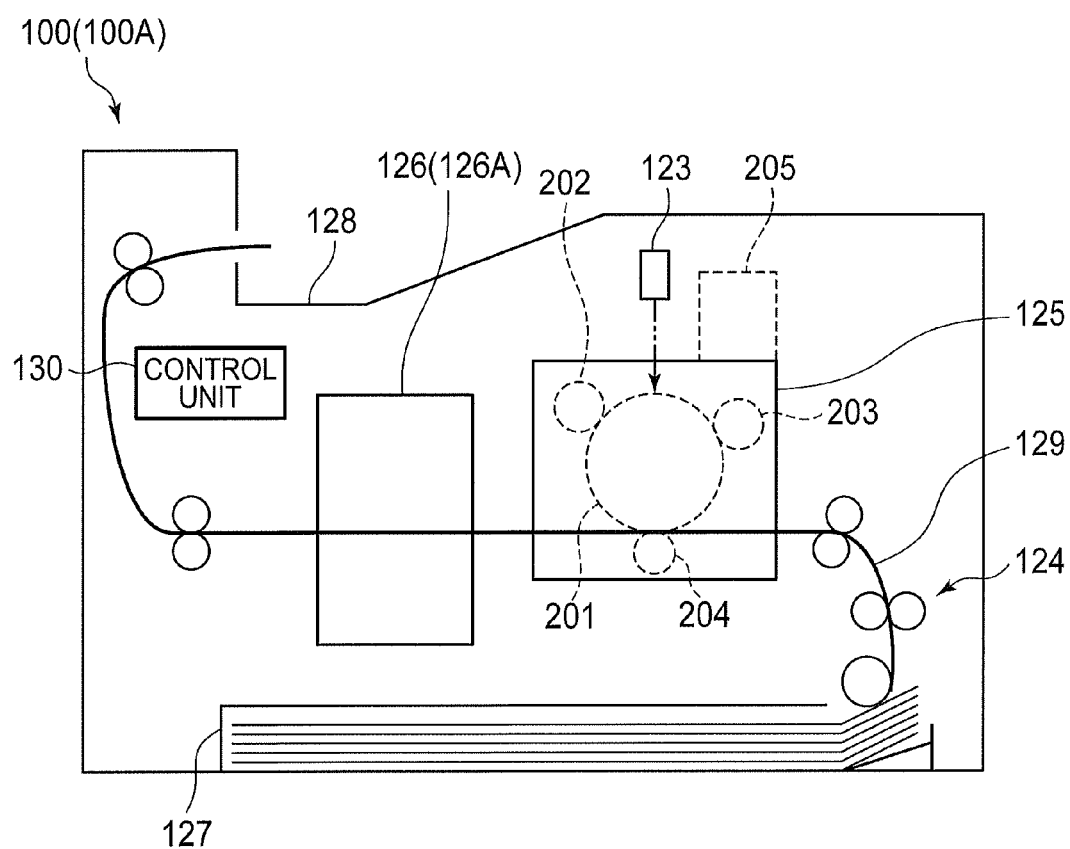
FIG. 1 is a schematic view showing a configuration of an image forming apparatus according to the first embodiment of the present invention.

FIG. 1 is a schematic view showing an entire configuration of an image forming apparatus 100 according to the first embodiment of the present invention. In FIG. 1, the image forming apparatus 100 is configured as a monochrome printer. However, the image forming apparatus 100 can also be configured as a color printer or the like. The image forming apparatus 100 includes an LED head 123 as an exposure unit, a medium conveying unit 124, a toner image forming unit 125 as a developer image forming unit, a medium cassette 127 as a medium feeding unit, and an ejection tray 128 as a medium ejection unit.

The medium cassette 127 is configured to store a plurality of media S such as printing papers, and to feed the media S one by one to a medium conveying path 129. The ejection tray 128 is configured to receive the media S on which images have been printed. The medium conveying unit 124 includes a plurality of conveying rollers, a conveying belt or the like, and is configured to convey the medium S (fed from the medium cassette 127) along the medium conveying path 129 toward the ejection tray 128. The medium conveying path 129 has an upstream end at the medium cassette 127, and a downstream end at the ejection tray 128.

The LED head 123 (as the exposure unit) is configured to emit light so as to form a latent image. As an example, the LED head 123 is configured to expose a surface of an image bearing body 201 (described below) of the toner image forming unit 125.

The toner image forming unit 125 is configured to form a toner image and to transfer the toner image to the medium S. As an example, the toner image forming unit 125 includes the image bearing body 201 such as a photosensitive drum. The image bearing body 201 has a surface on which a latent image is formed by being irradiated with light. The toner image forming unit 125 further includes a charging unit 202 that uniformly charges the surface of the image bearing body 201, a developing unit 203 that develops the latent image on the image bearing body 201 to form a developer image (i.e., a toner image), and a transfer unit 204 that transfers the developer image from the image bearing body 201 to the medium S. Further, a toner cartridge 205 (i.e., a developer storage body) is provided on the toner image forming unit 125 for supplying a toner (i.e., a developer) to the developing unit 203.

A fixing device 126 (i.e., a belt unit) is configured to fix the toner image (transferred to the medium S by the toner image forming unit 125) to the medium S. A detailed description of the configuration of the fixing device 126 will be made later. The image forming apparatus 100 has a control unit 130 that controls operations of the respective components of the image forming apparatus 100. The toner image forming unit 125 and the fixing device 126 are arranged in this order along the medium conveying path 129. The LED head 123 is disposed so as to face the toner image forming unit 125.

Under control of the control unit 130, the medium conveying unit 124 conveys the medium S from the medium cassette 127 to the toner image forming unit 125 at predetermined timing in synchronization with timing of image formation. The LED head 123 emits light based on image data (sent from the control unit 130) to the toner image forming unit 125. As an example, the LED head 123 emits light so as to expose the surface of the image bearing body 201 (uniformly charged by the charging unit 202) to form a latent image, and the latent image is developed by the developing unit 203. The toner image forming unit 125 forms the toner image on the medium S conveyed by the medium conveying unit 124. As an example, the transfer unit 204 transfers the toner image from the image bearing body 201 to the medium S. Thereafter, the medium S is conveyed by the medium conveying unit 124 to the fixing device 126. The fixing device 126 applies heat and pressure to the toner image so as to fix the toner image to the medium S. Then, the medium conveying unit 124 ejects the medium S (to which the toner image is fixed) to the ejection tray 128.

Figure 2:
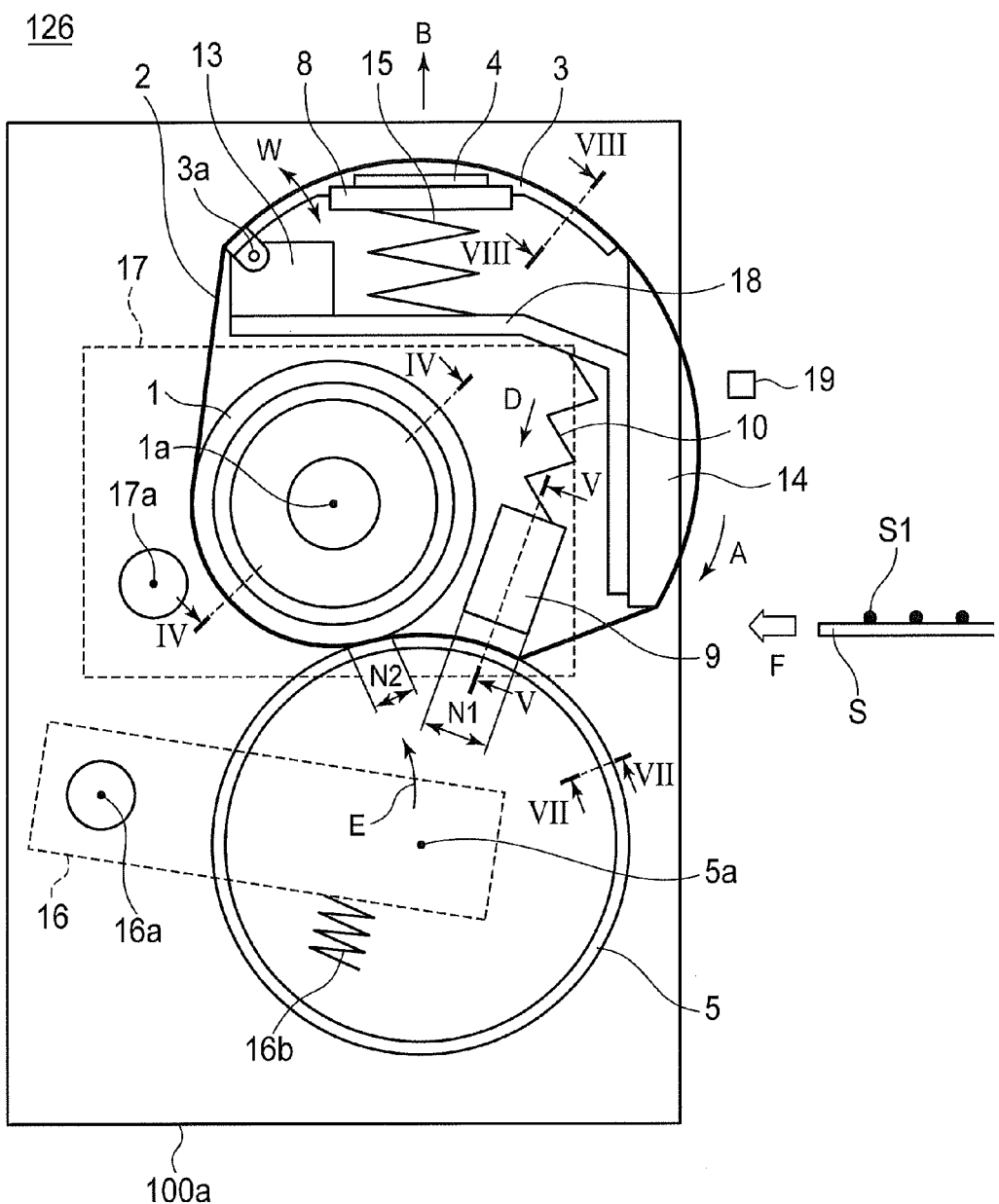
FIG. 2 is a schematic sectional view showing a configuration of a fixing device according to the first embodiment of the present invention.

Next, a configuration of the fixing device 126 will be described with reference to FIG. 2. FIG. 2 is a sectional view showing the fixing device 126.

The fixing device 126 includes a fixing belt 2 (i.e., a belt member) in the form of an endless belt. The fixing belt 2 is provided for applying heat to the medium S and for conveying the medium S. The fixing device 126 further includes a pressure roller 5 as a second roller provided on an outer side of the fixing belt 2. The pressure roller 5 is provided for pressing the fixing belt 2. A fixing pad 9 (i.e., a pressing member) is provided on an inner side (i.e., an inner circumferential surface side) of the fixing belt 2 in such a manner that the fixing pad 9 and the pressure roller 5 form a first nip portion N1 via the fixing belt 2. A fixing roller 1 as a first roller is provided on the inner side of the fixing belt 2 in such a manner that the fixing roller 1 and the pressure roller 5 form a second nip portion N2 via the fixing belt 2. The fixing belt 2 rotates in a direction shown by an arrow A in FIG. 2.

In the fixing device 126, the first nip portion N1 and the second nip portion N2 constitute a pressing unit that presses the medium S against the fixing belt 2. The medium S is introduced to the nip portions N1 and N2 in a direction shown by an arrow F. In this regard, the number of nip portions constituting the pressing unit is not limited.

A stretching member 3 is provided on the inner side of the fixing belt 2. The stretching member 3 is provided for stretching the fixing belt 2 and for heating the fixing belt 2. A planar heater 4 (i.e., a heating member or a heating unit) and a pressing member 8 are provided on further inner side of the stretching member 3. The planar heater 4 is a heat source for heating the stretching member 3. The pressing member 8 is configured to press the planer heater 4 against the stretching member 3. A guide member 14 is provided on the inner side of the fixing belt 2. The guide member 14 is configured to guide a rotation of the fixing belt 2. In a rotating direction (i.e., a moving direction) of the fixing belt 2 shown by the arrow A, the guide member 14 is located on a downstream side of the stretching member 3 and is located on an upstream side of the fixing pad 9.

In the fixing device 126 of this embodiment, the planar heater 4 (i.e., the heating member) is used as the heating unit for generating heat applied to the medium S. However, it is also possible to use a plurality of heating members. For example, it is possible to provide a second heating unit such as a halogen heater inside the pressure roller 5 in order to promote an increase in a surface temperature of the pressure roller 5.

A temperature of the fixing belt 2 is detected by a temperature detecting unit 19. The temperature of the fixing belt 2 is controlled to a predetermined temperature by the control unit 130. For example, the temperature detecting unit 19 is configured to detect the temperature of the fixing belt 2 by contacting an inner or outer circumferential surface of the fixing belt 2. Alternatively, it is also possible that the temperature detecting unit 19 is provided so as to face the inner or outer circumferential surface of the fixing belt 2 via a small gap, and is configured to detect the temperature of the fixing belt 2 in a non-contact manner.

The fixing pad 9 is supported by a lever 17. The lever 17 is supported by a frame 100*a* of a main body of the image forming apparatus 100 in such a manner that the lever 17 is rotatable about a rotation fulcrum 17*a*. A holder 18 (i.e., a supporting body) is located in a space surrounded by the fixing belt 2. The holder 18 is supported by the frame 100*a*. A spring 10 is provided for biasing the fixing pad 9 in a direction shown by an arrow D in which the fixing pad 9 is pressed against the pressure roller 5. An end of the spring 10 is held by the holder 18, and the other end of the spring 10 contacts the fixing pad 9.

Since the lever 17 is rotatable about the rotation fulcrum 17*a*, a movable direction of the fixing pad 9 (held by the lever 17) is limited. With such an arrangement, the fixing pad 9 is accurately pressed against the pressure roller 5 so as to form the first nip portion N1.

The fixing roller 1 is supported by the frame 100*a* in such a manner that the fixing roller 1 is rotatable about a rotation axis la via not shown bearings. The pressure roller 5 is held by a lever 16 in such a manner that the pressure roller 5 is rotatable about a rotation axis 5*a* via not shown bearings. The lever 16 is supported by the frame 100*a* in such a manner that the lever 16 is rotatable about a fulcrum 16*a*. The lever 16 is biased by a resilient member 16*b* such as a spring in a direction shown by an arrow E (about the fulcrum 16*a*) in which the pressure roller 5 is pressed against the fixing roller 1. An end of the resilient member 16*b* contacts the lever 16, and the other end of the resilient member 16*b* is held by the frame 100*a*.

With such an arrangement, the pressure roller 5 is pressed against the fixing pad 9 and the fixing roller 1 via the fixing belt 2. The first nip portion N1 is a region where the pressure roller 5 is pressed against the fixing pad 9 via the fixing belt 2. The second nip portion N2 is a region where the pressure roller 5 is pressed against the fixing roller 1 via the fixing belt 2.

The stretching member 3 is supported by the holder 18 in such a manner that the stretching member 3 is rotatable in a direction shown by an arrow W about a fulcrum 3*a* via bearings. The pressing member 8 is held by the stretching member 3, and is biased in a direction shown by an arrow B by a spring 15 (i.e., a biasing member) supported by the holder 18. The stretching member 3 is biased in a direction shown by the arrow B by the spring 15 via the planar heater 4 and the pressing member 8. With such an arrangement, the stretching member 3 biases the fixing belt 2 in the direction shown by the arrow B to cause the fixing belt 2 to be stretched.

Figure 3A:
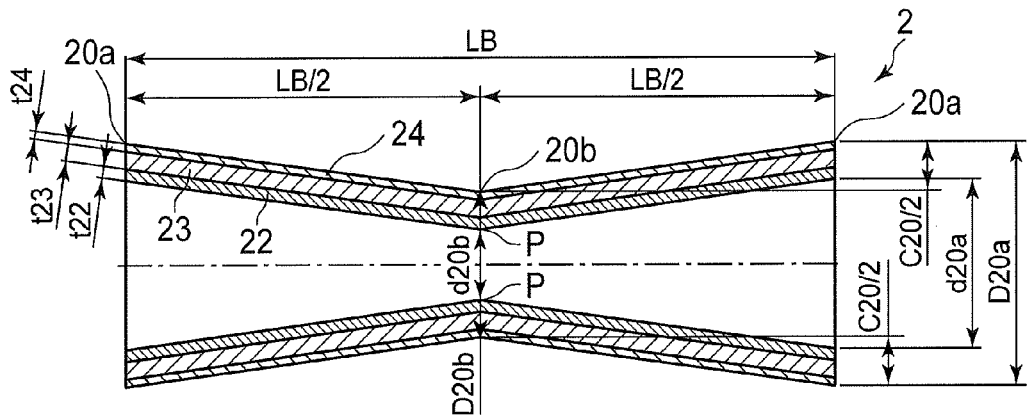
FIGS. 3A, 3B, 3C and 3D are sectional views showing examples of a fixing belt according to the first embodiment of the present invention.
Figure 6:
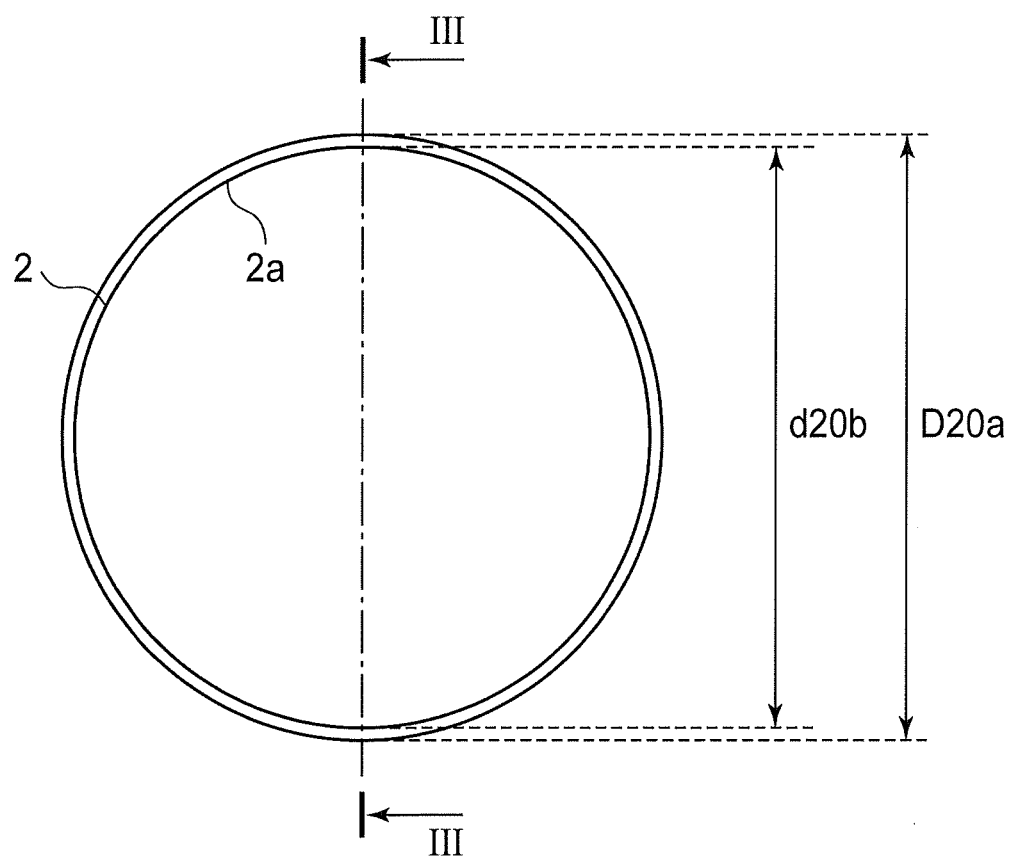
FIG. 6 is a side view showing the fixing belt according to the first embodiment of the present invention in a state where the fixing belt is taken out from the fixing device.

Next, a configuration of the fixing belt 2 is described. FIG. 3A is a sectional view showing an example of a shape of the fixing belt 2. In FIG. 3A, the fixing belt 2 is illustrated in a state where the fixing belt 2 is taken out from a main body of the fixing device 126 and where no force is applied to the fixing belt 2. In this state, the fixing belt 2 is in the form of a circle (see FIG. 6) as seen from a side. FIG. 3A corresponds to a sectional view taken along a line (i.e., Line III-III in FIG. 6) passing through a center of the circle formed by a side surface of the fixing belt 2. In FIG. 3A, a taper or crown amount (for example, 100 μm) is illustrated in an exaggerated size. In other words, respective parts of the fixing belt 2 are illustrated at different reduction ratios, in order to show that an inner circumferential surface and an outer circumferential surface of the fixing belt 2 have tapered shapes.

As shown in FIG. 3A, the fixing belt 2 includes a base layer 22, a resilient layer 23 and a releasing layer 24 laminated in this order from the inner side. An outer diameter of the fixing belt 2 is an outer diameter of the releasing layer 24. An inner diameter of the fixing belt 2 is an inner diameter of the base layer 22.

An outer diameter D20$b$ of the fixing belt 2 at a center portion 20$b$ in a widthwise direction of the fixing belt 2 is smaller than an outer diameter D20$a$ of the fixing belt 2 at each end portion 20$a$ in the widthwise direction of the fixing belt 2. That is, the fixing belt 2 has a reverse-crown shape (i.e., a concave shape).

In a particular example, the outer diameter D20$b$ of the fixing belt 2 at the center portion 20$b$ is 45.1 mm, and the outer diameter D20$a$ of the fixing belt 2 at each end portion 20$a$ is 45.2 mm. Further, an outer circumferential length (D20$b$×Π) of the fixing belt 2 at the center portion 20$b$ is shorter than an outer circumferential length (D20$a$×Π) of the fixing belt 2 at each end portion 20$a$. In this regard, the outer diameters D20$a$ and D20$b$ of the fixing belt 2 at the end portion 20$a$ and the center portion 20$b$ are measured using a taper gauge or pin gauge.

In FIG. 3A, the center portion 20$b$ of the fixing belt 2 is defined as a portion distanced from the end portion 20$a$ by a distance IB corresponding to a half (=LB/2) of a width LB of the fixing belt 2 in the widthwise direction of the fixing belt 2. A difference between the outer diameter D20$b$ of the fixing belt 2 at the center portion 20$b$ and the outer diameter D20$a$ of the fixing belt 2 at each end portion 20$a$ is expressed as a taper amount C20. In a particular example, the outer diameter D20$b$ of the fixing belt 2 at the center portion 20$b$ and the outer diameter D20$a$ of the fixing belt 2 at each end portion 20$a$ are determined so as to set the taper amount C20 to be 100 μm.

A thickness of the fixing belt 2 is constant throughout the width of the fixing belt 2. The above described taper amount C20 corresponds to a crown amount. In other words, the taper amount C20 corresponds to a protruding amount (or an inwardly protruding amount) of a convex portion that protrudes toward the stretching member 3. The taper amount C20 is preferably in a range from 10 μm to 200 μm (0.01 mm to 0.2 mm). That is, the convex portion is formed on the inner circumferential surface of the fixing belt 2 (i.e., a surface contacting the stretching member 3) so as to face the stretching member 3.

In this embodiment, the outer diameter of the fixing belt 2 straightly and gradually increases from the center portion 20$b$ toward either end 20$a$. That is, the fixing belt 2 has inclined portions extending from the end portion 20$a$ to the center portion 20$b$.

An inner diameter d20$b$ of the fixing belt 2 at the center portion 20$b$ is smaller than an inner diameter d20$a$ of the fixing belt 2 at each end portion 20$a$. It is preferable that a difference between the inner diameter d20$b$ of the fixing belt 2 at the center portion 20$b$ and the inner diameter d20$a$ of the fixing belt 2 at each end portion 20$a$ is in a range from 10 μm to 200 μm (0.01 mm to 0.2 mm). Further, it is preferable that a difference between the inner diameter (d20$b$) of the fixing belt 2 at the center portion 20$b$ and the inner diameter (d20$a$) of the fixing belt 2 at the end portion 20$a$ is in a range from 0.003% to 0.063% with respect to the width LB of the fixing belt 2 in the widthwise direction. In a particular example, the inner diameter d20$b$ of the fixing belt 2 at the center portion 20$b$ is 44.9 mm, and the inner diameter d20$a$ of the fixing belt 2 at each end portion 20$a$ is 45 mm.

Therefore, an inner circumferential length (d20$b$×Π) of the fixing belt 2 at the center portion 20$b$ is shorter than an inner circumferential length (d20$a$×Π) of the fixing belt 2 at each portion 20$a$. It is preferable that a difference between the inner diameter (d20$b$×Π) of the fixing belt 2 at the center portion 20$b$ and the inner diameter (d20$a$×Π) of the fixing belt 2 at the end portion 20$a$ is in a range from 0.003% to 0.063% with respect to the width LB of the fixing belt 2 in the widthwise direction.

In this embodiment, the inner diameter of the fixing belt 2 gradually increases from the center portion 20$b$ toward either end 20$a$.

Figure 3B:
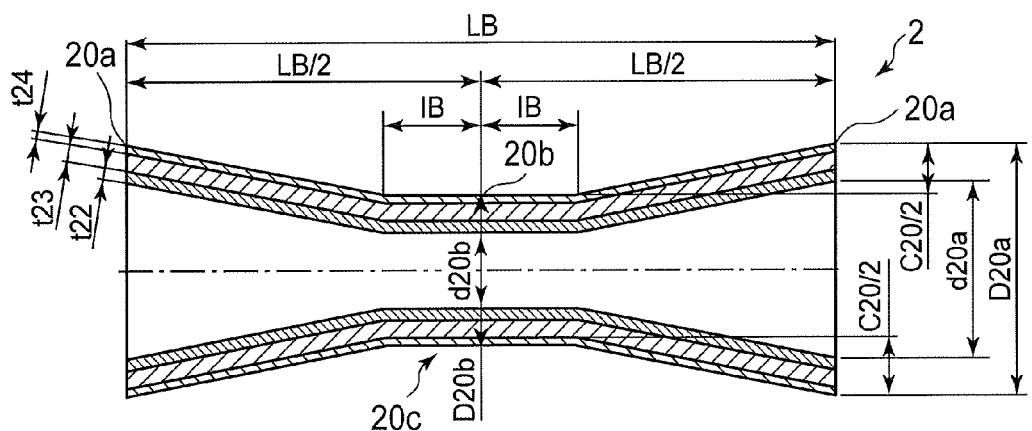

FIG. 3B shows another example of the shape of the fixing belt 2. In FIG. 3B, the outer diameter of the fixing belt 2 is constant (D20$b$) at a center region 20$c$ extending a certain distance IB on each side from the center portion 20$b$. The outer diameter of the base layer 22 straightly and gradually increases from the center region 20$c$ toward either end 20$a$.

Figure 3C:
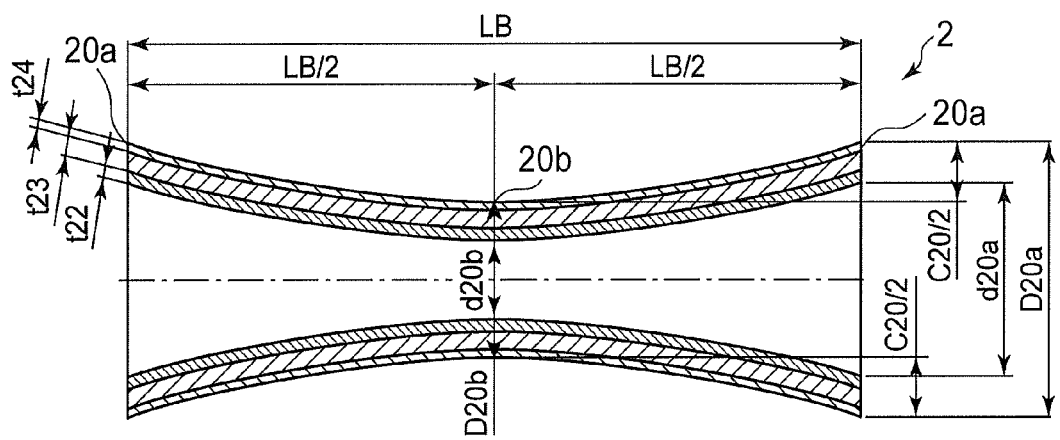

FIG. 3C shows a modification of the shape of the fixing belt 2 based on the shape of the fixing belt 2 shown in FIG. 3A. In FIG. 3C, the outer diameter of the fixing belt 2 gradually increases from the center portion 20$b$ toward either end portion 20$a$ in a smooth continuous curve.

Figure 3D:
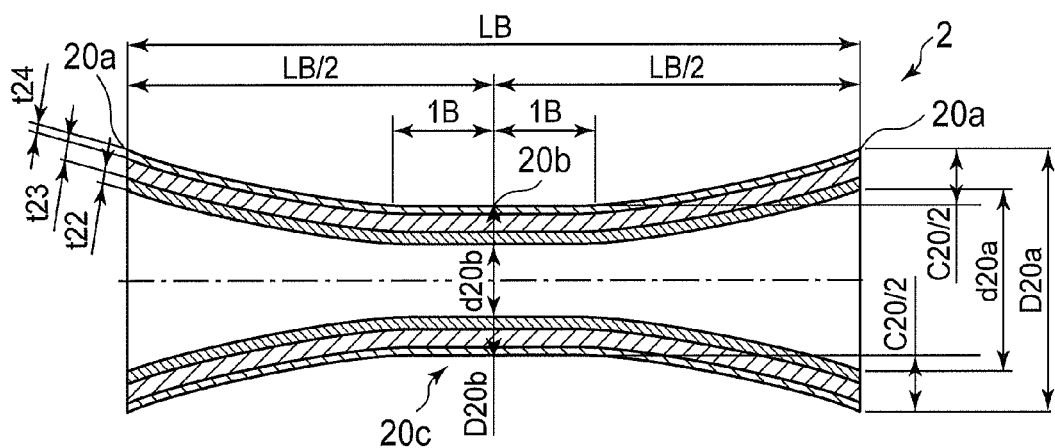

FIG. 3D shows a modification of the shape of the fixing belt 2 based on the shape of the fixing belt 2 shown in FIG. 3B. In FIG. 3D, the outer diameter of the fixing belt 2 is constant (D20$b$) at the center region 20$c$, and gradually increases from the center region 20$c$ toward either end portion 20$a$ in a smooth continuous curve.

The layers of the fixing belt 2 will be described. The base layer 22 is formed of, for example, polyimide. In a particular example, the base layer 22 has a thickness t22 (FIGS. 3A-3D) of 80 μm.

The thickness of the base layer 22 at the center portion 20$b$ is preferably the same as the thickness of the base layer 22 at each end portion 20$a$. In other words, the base layer 22 is preferably formed to have a constant thickness throughout the width of the fixing belt 2. The base layer 22 is provided on the inner side of the fixing belt 2, and directly contacts a resilient layer of the fixing roller 1, a releasing layer 93 of the fixing pad 9 and an outer circumferential surface of the stretching member 3. In a particular example, the inner diameter of the base layer 22 is set to 44.9 mm at the center portion 20$b$, and 45 mm at each end portion 20$a$.

The resilient layer 23 is formed of, for example, a silicone rubber. In a particular example, the resilient layer 23 has a thickness t23 (FIGS. 3A-3D) of 100 μm. The thickness of the resilient layer 23 at the center portion 20$b$ is preferably the same as the thickness of the resilient layer 23 at each end portion 20a. In other words, the resilient layer 23 is preferably formed to have a constant thickness throughout the width of the fixing belt 2.

The releasing layer 24 is formed by coating, for example, PFA (Perfluoroalkoxy Alkane) on the resilient layer 23. In a particular example, the releasing layer 24 has a thickness t24 (FIGS. 3A-3D) of 15 µm. The releasing layer 24 has a function to prevent the toner from adhering to the fixing belt 2 in a process in which the toner image is fixed to the medium S. The thickness of the releasing layer 24 at the center portion 20b is preferably the same as the thickness of the releasing layer 24 at the end portion 20a. In other words, the releasing layer 24 is preferably formed to have a constant thickness throughout the width of the fixing belt 2.

With such a configuration, a total thickness of the fixing belt 2 (i.e., a sum of thicknesses of the base layer 22, the resilient layer 23 and the releasing layer 24) of this embodiment is 195 µm. The thickness of the fixing belt 2 at the center portion 20b is the same as the thickness of the fixing belt 2 at the end portion 20a. That is, the fixing belt 2 has a constant thickness throughout the width of the fixing belt 2.

In a particular example, the width LB of the fixing belt 2 in the widthwise direction thereof is set to 320 mm. The fixing belt 2 preferably has a constant thickness as described above. More specifically, a variation of the thickness of the fixing belt 2 is preferably within 15% of an average thickness. In this embodiment, the thickness of the fixing belt 2 is measured at arbitrary ten points, and a variation of the measured thicknesses is confirmed to be within 15% of an average thickness.

Next, a configuration of the fixing roller 1 will be described.

In FIG. 2, a gear (not shown) is fixed to a shaft of the fixing roller 1. The fixing roller 1 is driven by a driving force transmitted to the gear from the medium conveying unit 124, and rotates clockwise in FIG. 2. When the fixing roller 1 rotates, the fixing belt 2 rotates in a direction shown by the arrow A by a friction force between the fixing belt 2 and the fixing roller 1. The pressure roller 5 rotates counterclockwise in FIG. 2 by a friction between the pressure roller 5 and the fixing belt 2.

Figure 4A:
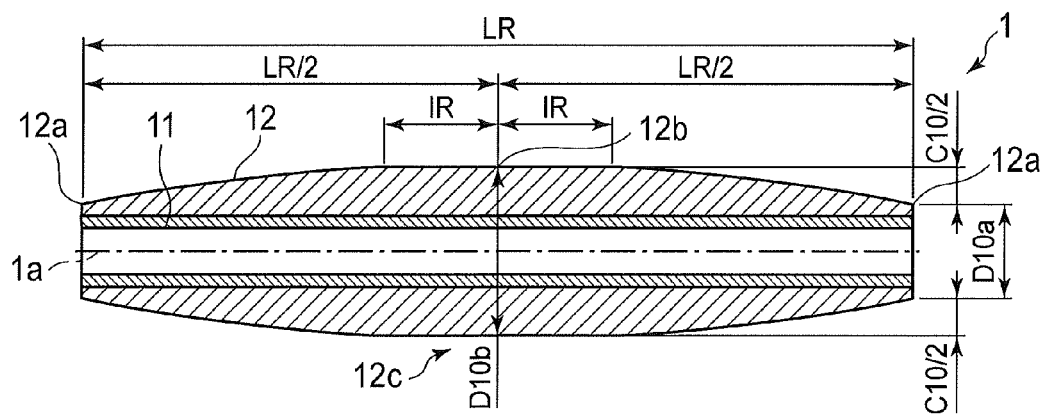
FIGS. 4A, 4B, 4C and 4D are sectional views showing examples of a fixing roller according to the first embodiment of the present invention.

FIG. 4A is a sectional view showing an example of a shape of the fixing roller 1 cut along a plane including the rotation axis la. FIG. 4A corresponds to a sectional view taken along line IV-IV in FIG. 2. In FIG. 4A, a crown amount (for example, 350 µm) of the fixing roller 1 is illustrated in an exaggerated size. In other words, respective parts of the fixing roller 1 are illustrated at different reduction ratios, in order to show that an outer layer (i.e., a resilient layer 12) of the fixing roller 1 has a crown shape.

As shown in FIG. 4A, the fixing roller 1 of this embodiment includes a metal core 11 having a cylindrical shape and made of metal, and a resilient layer 12 formed on an outer circumferential surface of the metal core 11. The metal core 11 is formed of, for example, iron. The resilient layer 12 is formed of, for example, fluoro-rubber or silicone rubber.

The outer circumferential surface of the fixing roller 1 (i.e., the outer circumferential surface of the resilient layer 12) has a crown shape. That is, an outer diameter D10b of the fixing roller 1 at a center portion 12b in an axial direction (i.e., a direction of the rotation axis la) is larger than an outer diameter D10a of the fixing roller 1 at each end portion 12a in the axial direction.

In FIG. 4A, the center portion 12b is defined as a portion distanced from the end portion 12a by a distance IR corresponding to a half (=LR/2) of a length LR of the fixing roller 1. The outer diameter of the resilient layer 12 is constant (D10b) at a center region 12c extending a certain distance IR on each side from the center portion 12b. The outer diameter of the resilient layer 12 gradually decreases from the center region 12c toward either end portion 12a in a smooth continuous curve.

As shown in FIG. 4A, in a particular example, the length LR of the fixing roller 1 is set to 345 mm. The above described distance IR is set to 17.5 mm. The outer diameter D10b of the fixing roller 1 at the center portion 12b is set to 25 mm. The outer diameter D10a of the fixing roller 1 at the end portion 12a is set to 24.65 mm. In this regard, the length LR of the fixing roller 1 in the axial direction is set to be larger than the width LB (320 mm) of the fixing belt 2.

Figure 4B:
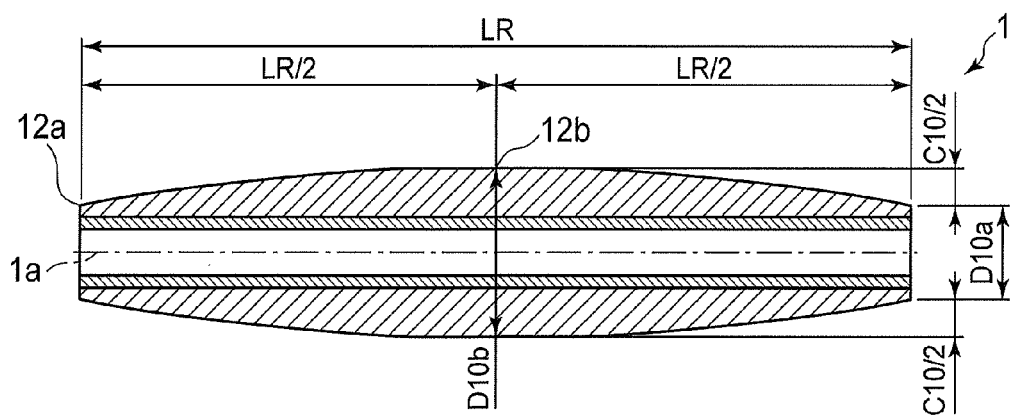

FIG. 4B shows another example of the shape of the fixing roller 1. In FIG. 4B, the outer diameter of the fixing roller 1 (i.e., the outer diameter of the resilient layer 12) gradually decreases from the center portion 12b toward either end portion 12a in a smooth continuous curve in the axial direction of the fixing roller 1.

Figure 4C:
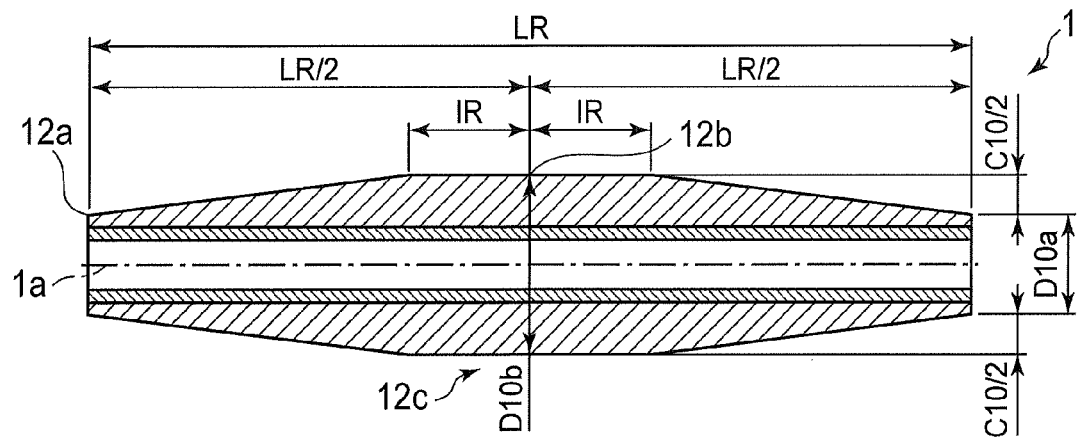

FIG. 4C shows a modification of the shape of the fixing roller 1 based on of the shape of the fixing roller 1 shown in FIG. 4A. In FIG. 4C, the outer diameter of the fixing roller 1 is constant (D10b) at the center region 12c, and straightly and gradually decreases from the center region 12c toward either end portion 12a in the axial direction of the fixing roller 1.

Figure 4D:
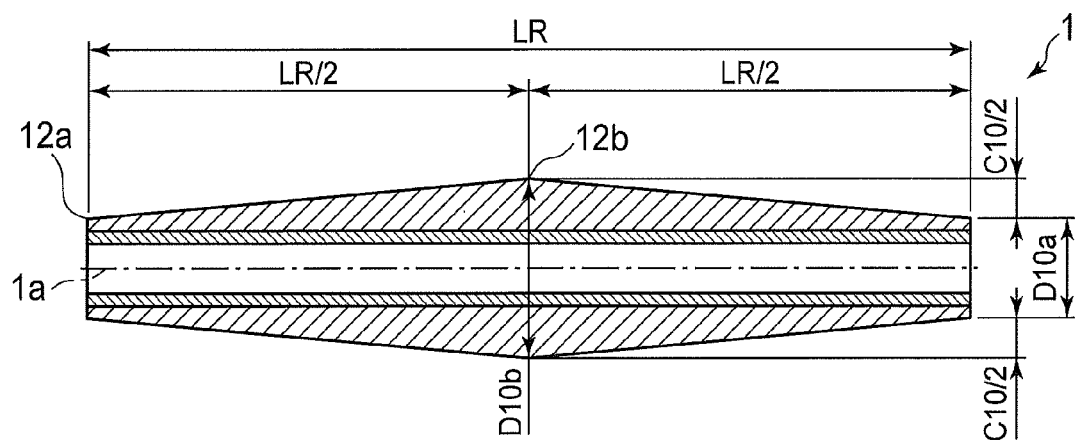

FIG. 4D shows a modification of the shape of the fixing roller 1 based on the shape of the fixing roller 1 shown in FIG. 4B. In FIG. 4D, the outer diameter of the fixing roller 1 straightly and gradually decreases from the center portion 12b toward either end portion 12a in the axial direction of the fixing roller 1.

In FIGS. 4A through 4D, the difference (D10b-D10a) between the outer diameter D10b of the fixing roller 1 (i.e., the outer diameter of the resilient layer 12) at the center portion 12b and the outer diameter D10a of the fixing roller 1 (i.e., the outer diameter of the resilient layer 12) at the end portion 12a is defined as a crown amount C10.

In a particular example, the outer diameter D10b of the fixing roller 1 at the center portion 12b and the outer diameter D10a of the fixing roller 1 at each end portion 12a are determined so as to set the crown amount C10 to be 350 µm.

In this regard, a difference between a radius of the fixing roller 1 at the center portion 12b and a radius of the fixing roller 1 at each end portion 12a corresponds to a half (=C10/2) of the crown amount C10. This value (i.e., C10/2) corresponds to a protruding amount of the resilient layer 12 at the center portion 12b with respect to the end portion 12a. Therefore, when the crown amount C10 is set to 350 µm, the protruding amount of the resilient layer 12 at the center portion 12b with respect to the end portion 12a is 175 µm.

In this embodiment, the crown amount C10 (for example, 350 µm) of the fixing roller 1 is set to be larger than the crown amount C20 (for example, 100 µm) of the fixing belt 2.

Next, a configuration of the fixing pad 9 will be described.

Figure 5A:
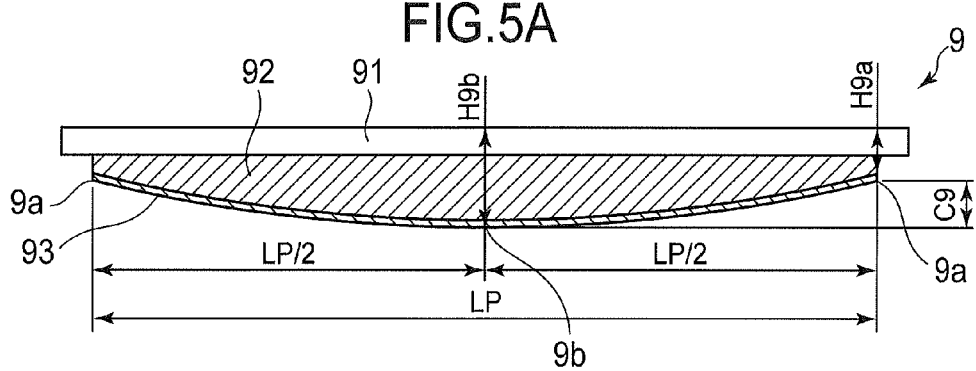
FIGS. 5A, 5B, 5C and 5D are sectional views showing examples of a fixing pad according to the first embodiment of the present invention.

FIG. 5A is a sectional view showing an example of a shape of the fixing pad 9. FIG. 5A corresponds to a sectional view taken along line V-V in FIG. 2. In FIG. 5A, a crown amount (for example, 200 µm) of the fixing pad 9 is illustrated in an exaggerated size. In other words, respective parts of the fixing pad 9 are illustrated at different reduction ratios, in order to show that a surface layer 93 of the fixing pad 9 has a crown shape.

The fixing pad 9 includes a base member 91, a resilient layer 92 formed integrally with the base member 91, and a surface layer 93 provided on the resilient layer 92 so that the surface layer 93 faces the fixing belt 2. The base member 91 is formed of a metal such as aluminum or iron. The resilient layer 92 is formed of, fluoro-rubber, silicone rubber or the like. The surface layer 93 is formed of material (for example, fluorine-based material, a glass fiber sheet or the like) having low surface friction resistance.

As shown in FIG. 5A, the resilient layer 92 of the fixing pad 9 has a crown shape (i.e., a convex shape). That is, a height H9b from the base member 91 to the surface layer 93 at a center portion 9b in a longitudinal direction of the fixing pad 9 is larger than a height H9a from the base member 91 to the surface layer 93 at an end portion 9a in the longitudinal direction. In FIG. 5A, the center portion 9b is defined as a portion distanced from the end portion 9a by a distance corresponding to a half (=LP/2) of a length LP of the fixing pad 9. The longitudinal direction of the fixing pad 9 is parallel with the widthwise direction of the fixing belt 2.

Further, the height of the fixing pad 9 (from the base member 91 to the surface layer 93) gradually decreases from the center portion 9b toward either end portion 9a in a smooth continuous curve. In FIG. 5A, a difference between the height H9b at the center portion 9b and the height H9a at the end portion 9a is defined as a crown amount C9.

As shown in FIG. 5A, in this embodiment, the length LP of the fixing pad 9 is set to 319 mm. The height H9b is set to 14.5 mm, and the height H9a is set to 14.3 mm. In this regard, the length LP of the fixing pad 9 in the axial direction (i.e., the axial direction of the fixing roller 1) is set to be smaller than the width LB of the fixing belt 2. The crown amount C9 (for example, 200 μm) is set to be smaller than the crown amount C10 (for example, 350 μm) of the fixing roller 1, but larger than the crown amount C20 of the fixing belt 2 (for example, 100 μm).

Figure 5B:
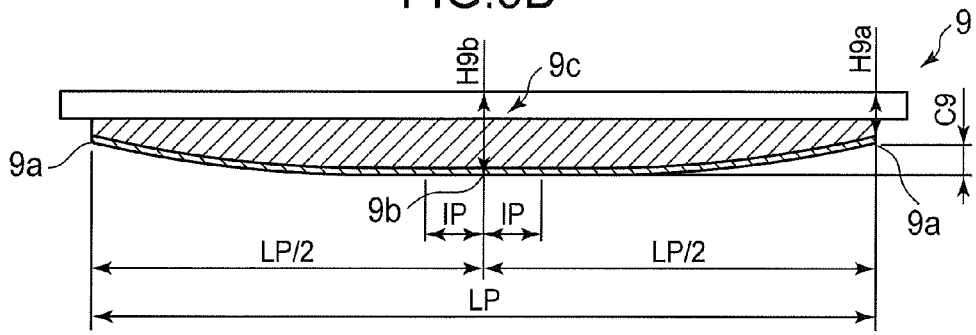

FIG. 5B shows another example of the shape of the fixing pad 9. In FIG. 5B, the height of the fixing pad 9 from the base member 91 to the surface layer 93 is constant (H9b) at a center region 9c extending a certain distance IP on each side from the center portion 9b, and gradually decreases from the center region 9c toward either end portion 9a in a smooth continuous curve.

Figure 5C:
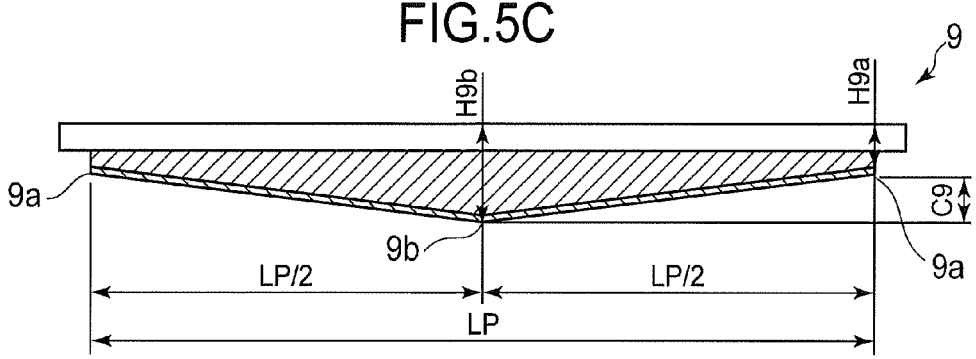

FIG. 5C shows a modification of the shape of the fixing pad 9 based on the shape of the fixing pad 9 of FIG. 5A. In FIG. 5C, the height of the fixing pad 9 from the base member 91 to the surface layer 93 straightly and gradually decreases from the center portion 9b toward either end portion 9a.

Figure 5D:
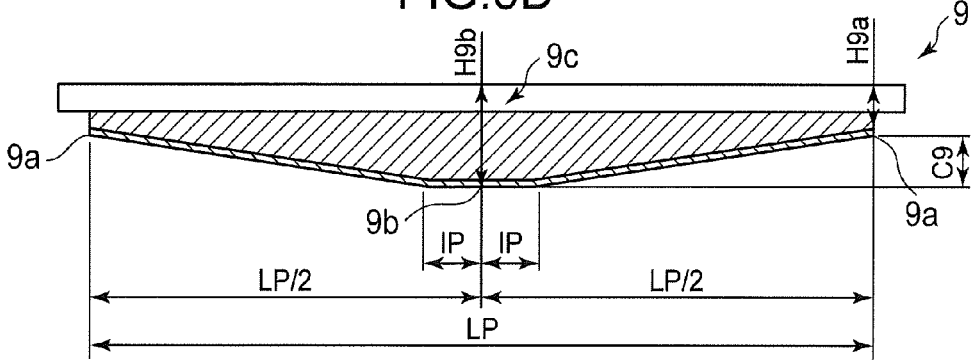

FIG. 5D shows a modification of the shape of the fixing pad 9 based on the shape of the fixing pad 9 of FIG. 5A. In FIG. 5D, the height of the fixing pad 9 from the base member 91 to the surface layer 93 is constant (H9b) at the center region 9c, and straightly and gradually decreases from the center region 9c toward either end portion 9a.

In a particular example, the height H9b of the fixing pad 9 at the center portion 9b and the height H9a of the fixing pad 9 at each end portion 9a are determined so as to set the crown amount C9 to be 200 μm.

Figure 7:
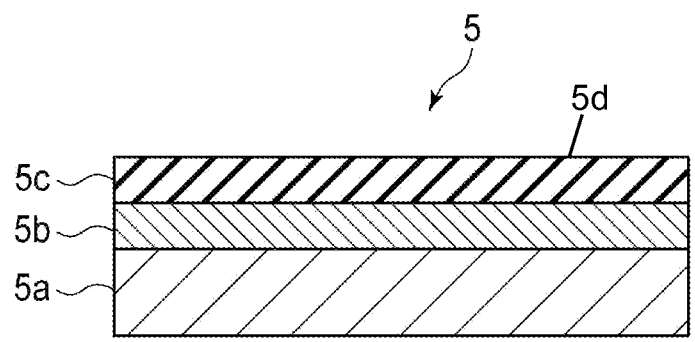
FIG. 7 is a sectional view showing a configuration of a pressure roller according to the first embodiment of the present invention.

Next, a configuration of the pressure roller 5 will be described. FIG. 7 is a sectional view showing the pressure roller 5 taken along line VII-VII in FIG. 2.

As shown in FIG. 7, the pressure roller 5 includes a metal core 5a, a resilient layer 5b formed on an outer circumferential surface of the metal core 5a, and a surface releasing layer 5c formed on the resilient layer 5b. The metal core 5a is formed of metal such as aluminum or iron. The resilient layer 5b is formed of, for example, fluorine-rubber or silicone rubber. The surface releasing layer 5c is formed of, for example, fluorine-based resin.

The surface releasing layer 5c (i.e., a surface layer of the pressure roller 5) has a smooth surface 5d (i.e., a second surface portion) which substantially linearly extends in an axial direction (i.e., a direction of the rotation axis 5a) of the pressure roller 5.

Figure 8:
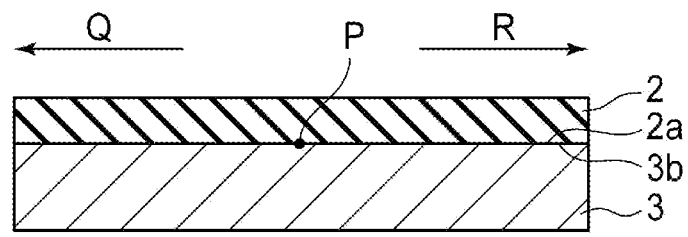
FIG. 8 is a sectional view showing a configuration of a stretching member according to the first embodiment of the present invention.

Next, a configuration of the stretching member 3 will be described. FIG. 8 is a sectional view showing the stretching member 3 taken along line VIII-VIII in FIG. 2 in a state where the fixing belt 2 is stretched by the stretching member 3.

As shown in FIG. 8, the stretching member 3 has a contact surface (i.e., a contact portion) 3b contacting an inner circumferential surface (i.e., a contact surface) 2a of the fixing belt 2. The contact surface 3b is a smooth surface that extends substantially linearly in parallel with the rotation axis 1a of the fixing roller 1. More specifically, an angle between the rotation axis 1a and the contact surface 3b is less than or equal to 2°. Further, the contact surface 3b is preferably a smooth surface. More specifically, the contact surface 3b has an arithmetic mean roughness Ra in a range from 0.2 μm to 1.6 μm. The contact surface 2a of the fixing belt 2 (contacting the contact surface 3b of the stretching member 3) has an arithmetic mean roughness Ra in a range from 0.1 μm to 1.6 μm.

A biasing force of the spring 15 (FIG. 2) is larger than a recovery force of the fixing belt 2 for recovering an original shape of the fixing belt 2, and therefore the contact surface 2a of the fixing belt 2 is restrained by the stretching member 3. That is, the fixing belt 2 is stretched in such a manner that the fixing belt 2 is deformed along the contact surface 3b of the stretching member 3 substantially linearly in the axial direction of the fixing roller 1.

For example, the stretching member 3 can be formed of metal such as aluminum or copper, or alloy mainly composed of aluminum, copper or the like having high machining properties. Alternatively, the stretching member 3 can be formed of iron, iron-based alloy, stainless steel or the like having high heat resistance and high rigidity. Further, it is also possible to fill grease (for example, silicone grease or fluoro-ether grease) between the stretching member 3 and the planar heater 4 in order to enhance thermal conductivity. It is also possible to form a resin layer of fluorine-based resin on the contact surface 3b that contacts the fixing belt 2 in order to enhance slidability.

Next, a configuration of the planar heater 4 will be described.

The planar heater 4 (FIG. 1) is a heating element that generates heat when current flows therethrough. The planar heater 4 is formed of, for example, a ceramic heater or stainless heater. To be more specific, the planar heater 4 is obtained by forming a resistance heating element of silver (Ag) on a substrate of stainless steel (SUS430) via a thin glass film as an electric insulation layer. Further, electrodes are formed on ends of the resistance heating element. Electrodes are formed of metal such as silver having high chemical stability and low electric resistance, or high melting point metal such as tungsten. A protection film is formed so as to cover the resistance heating element. The protection film is formed of glass, or fluorine-based resin (for example, PTFE (polytetra-fluoroethylene), PFA (perfluoroalkoxy alkane), FEP (copolymer of hexafluoro-propylene and tetrafluoro-ethylene).

Next, a configuration of the guide member 14 will be described.

The guide member 14 has a function to stabilize a rotation of the fixing belt 2. The guide member 14 is formed of, for example, resin having high heat resistance such as PPS (polyphenylene sulfide), PAI (polyamide-imide), PI (polyimide), PEEK (polyether ether ketone), LCP (liquid crystal polymer), or a composite material of at least one of these resin and ceramic, metal, glass or the like.

It is also possible to form a layer of fluorine-based resin (preferably, heat resistant resin of a grade with which high slidability is obtained) on a surface of the guide member 14 contacting the fixing belt 2 in order to enhance slidability.

<<Operation of First Embodiment>>

An operation of the image forming apparatus 100 of the first embodiment will be described.

When the image forming apparatus 100 starts a printing operation, the control unit 130 causes the fixing roller 1 of the fixing device 126 to start rotating. As the fixing roller 1 starts rotating, the fixing belt 2 rotates in the direction indicated by the arrow A in FIG. 2. Further, the control unit 130 starts applying electric power to the planar heater 4 of the fixing device 126, and the planar heater 4 generates heat. The heat of the planar heater 4 is transmitted to the stretching member 3 and the fixing belt 2.

The surface temperature of the fixing belt 2 is detected by the temperature detecting unit 19. Based on the detected temperature, the control unit 130 controls electric power applied to the planer heater 4, so that the surface temperature of the fixing belt 2 is maintained at a suitable temperature. In this regard, a position and a detecting method of the temperature detecting unit 19 are not limited to those described above.

Further, the control unit 130 causes the medium conveying unit 124 to convey the medium S from the medium cassette 127 to the toner image forming unit 125, and the control unit 130 causes the LED head 123 to emit light based on image data to the toner image forming unit 125. The toner image forming unit 125 forms the toner image on the medium S conveyed by the medium conveying unit 124 as described above. Thereafter, the medium S is conveyed by the medium conveying unit 124 to the fixing device 126.

In the fixing device 126, the medium S (on which the toner image is formed) is conveyed through the nip portion, i.e., the first nip portion N1 and the second nip portion N2. At the first nip portion N1 and the second nip portion N2, heat and pressure are applied to the medium S, and the toner image is fixed to the medium S.

The fixing belt 2 is rotated by the fixing roller 1 at a constant speed in the direction shown by the arrow A. As described above, the inner circumferential length of the fixing belt 2 at the center portion 20$b$ is d20$b$×Π. The inner diameter d20$a$ of the fixing belt 2 at each end portion 20$a$ is larger than the inner diameter d20$b$ at the center portion 20$b$ by the taper amount C20. Therefore, the inner circumferential length of the fixing belt 2 at each end portion 20$a$ is (d20$b$+C20)×ΠE. In other words, the inner circumferential length of the fixing belt 2 at the center portion 20$b$ is shorter than the inner circumferential length of the fixing belt 2 at each end portion 20$a$ by Π×C20 (i.e., (d20$b$+C20)×Π−d20$b$×Π).

As described above, the inner circumferential length of the fixing belt 2 at the center portion 20$b$ is shorter than the inner circumferential length of the fixing belt 2 at each end portion 20$a$ by Π×C20. However, since the fixing belt 2 is an integral body, an angular speed of the fixing belt 2 (i.e., the number of rotation per a unit of time) is constant over an entire region in the widthwise direction of the fixing belt 2. Therefore, the inner circumferential surface of the fixing belt 2 is applied with a force to cause each end portion 20$a$ to rotate faster than the center portion 20$b$. This force includes a component pulling the fixing belt 2 from the center portion 20$b$ toward either end portion 20$a$. Accordingly, when the fixing belt 2 slides along the surface of the stretching member 3, the force exerted on the contact surface 2$a$ of the fixing belt 2 includes the component pulling the fixing belt 2 from the center portion 20$b$ toward either end portion 20$a$.

Assuming that the fixing belt 2 is an endless belt divided into a plurality of sections in the rotating direction (i.e., a circumferential direction), a time required for the center portion 20$b$ to rotate one turn is shorter than a time required for the end portion 20$a$ to rotate one turn. This is because the inner circumferential length of the fixing belt 2 at the center portion 20$b$ is shorter than at the end portion 20$a$ by Π×C20 as described above, and because the fixing belt 2 rotates at a constant angular speed as a whole. However, in practice, the fixing belt 2 is an integral body, and therefore the angular speed of the fixing belt 2 is constant over the entire region in the widthwise direction of the fixing belt 2. Therefore, the rotation speed (or a moving speed) of the inner circumferential surface of the fixing belt 2 (contacting the stretching member 3) at each end portion 20$a$ is faster than at the center portion 20$b$. Accordingly, when the fixing belt 2 slides along the surface of the stretching member 3, the force exerted on the contact surface 2$a$ of the fixing belt 2 includes a component pulling the fixing belt 2 from the center portion 20$b$ toward either end portion 20$a$.

As shown in FIG. 8, in a state where the fixing belt 2 is biased by the stretching member 3, the contact surface 2$a$ of the fixing belt 2 contacts the contact surface 3$b$ of the stretching member 3 in a state where at an apex P (see FIG. 3A) of the fixing belt 2 is pressed by the stretching member 3. In this state, the biasing force of the spring 15 as the biasing member in the direction shown by the arrow B (FIG. 2) is larger than a recovery force of the fixing belt 2 to recover the original shape. Therefore, in a state where the fixing belt 2 is stretched by the stretching member 3, the state shown in FIG. 8 (where the contact surface 2$a$ of the fixing belt 2 contacts the contact surface 3$b$ of the stretching member 3) is maintained.

In this state, the fixing belt 2 is applied with the force by the stretching member 3 in a widthwise direction of the fixing belt 2 as shown by arrows Q and R in FIG. 8. The apex P is located at substantially the center of the fixing belt 2 in the widthwise direction as shown in FIG. 3A. Further, the taper amount from one end portion 20$a$ to the center portion 20$b$ is substantially the same as the taper amount from the other end portion 20$a$ to the center portion 20$b$. In other words, the fixing belt 2 has a substantially symmetrical shape with respect to the apex P in the widthwise direction. Therefore, the force in the direction shown by the arrow Q and the force in the direction shown by the arrow R are substantially the same. Accordingly, deformation of the fixing belt 2 in the widthwise direction (for example, deformation into a meandering shape) can be suppressed.

Regarding the force in the direction shown by the arrow Q and the force in the direction shown by the arrow R, it is only necessary that one of these forces is in a range from 90% to 110% with respect to the other of these forces. Further, regarding the position of the apex P, it is only necessary that the apex X is distanced from the end portion of the fixing belt 2 in the widthwise direction by a distance corresponding to from 50% to 60% of the width of the fixing belt 2.

The above described advantage can be obtained whichever of the shapes of the fixing belt 2 shown in FIGS. 3A through 3D is employed. In the case where the fixing belt 2 has the shape of the FIG. 3A in which the apex P is located at substantially the center of the fixing belt 2 in the widthwise direction and the tapers are provided between the center portion 20$b$ and both end portions 20$a$, a contact pressure shows its maximum in the vicinity of the apex P. Since the contact pressure at the apex P is larger than the contact pressure at each end portion, the fixing belt 2 is less likely to be subject to deformation in the widthwise direction (for example, deformation into a meandering shape). That is, the shape of the fixing belt 2 in the widthwise direction can be stabilized. As a result, the movement (rotation) of the fixing belt 2 can be stabilized.

Further, at a region where the fixing belt 2 contacts the pressure roller 5, a biasing force of the resilient member 16b biasing the pressure roller 5 against the fixing belt 2 is larger than a recovering force of the fixing belt 2 to recover the original shape. Therefore, at the region where the fixing belt 2 contacts the pressure roller 5, the fixing belt 2 maintains a smooth shape along the surface of the pressure roller 5. Accordingly, influence of the recovery force of the fixing belt 2 on the toner image and the medium S can be reduced.

Further, the fixing belt 2 is nipped by the fixing roller 1 and the pressure roller 5 at the first nip portion N1, and is nipped by the fixing pad 9 and the pressure roller 5 at the second nip portion N2. Therefore, the rotation (movement) of the fixing belt 2 conveyed through the nip portions can be stabilized.

<<Advantages of First Embodiment>>

The first embodiment of the present invention provides the following advantages.

In the first embodiment, the inner circumferential surface of the fixing belt 2 at the center portion 20b is shorter than the inner circumferential surface of the fixing belt 2 at each end portion 20a, and the convex portion is formed on the inner circumferential surface of the fixing belt 2 so as to contact the stretching member 3. The convex portion faces the contact surface 3b of the stretching member 3 as shown in, for example, FIGS. 3A through 3D. Therefore, the fixing belt 2 is applied with the force pulling the fixing belt 2 from the center portion 20b toward either end portion 20a. Accordingly, the rotation (movement) of the fixing belt 2 can be stabilized.

Further, in the first embodiment, the fixing belt 2 rotates stably, and therefore the fixing belt 2 and the stretching member 3 stably contact each other. Accordingly, the fixing belt 2 can be stably heated.

Second Embodiment

A fixing device and an image forming apparatus according to the second embodiment of the present invention will be described.

<<Configuration of Second Embodiment>>

The image forming apparatus 100A of the second embodiment has the same configuration as the image forming apparatus 100 shown in FIG. 1 except the configuration of the fixing device 126A. Hereinafter, the fixing device 126A of the second embodiment will be described focusing on a difference from the fixing device 126 of the first embodiment.

Figure 9:
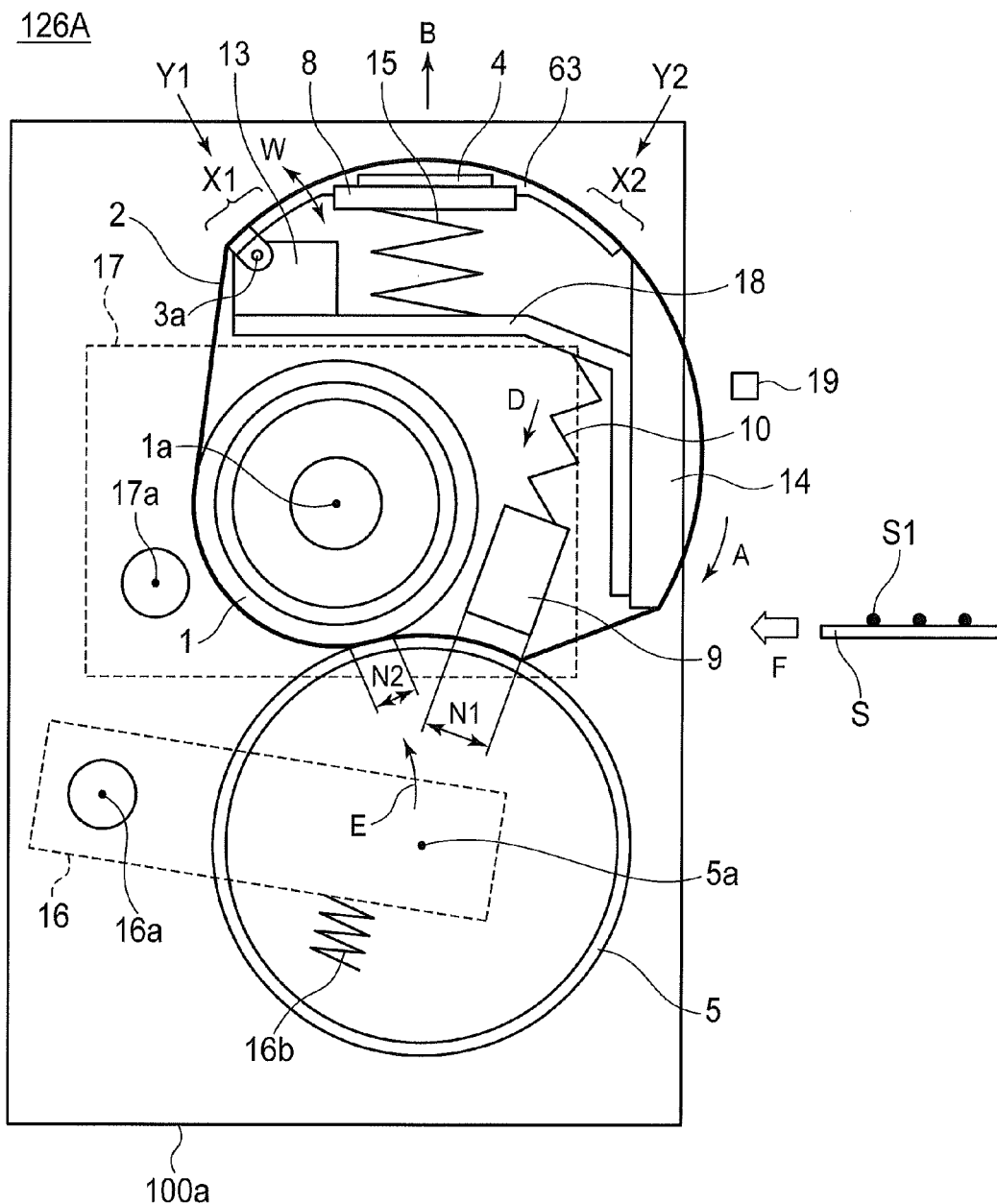
FIG. 9 is a schematic sectional view showing a fixing device according to the second embodiment of the present invention.

FIG. 9 is a schematic view showing the fixing device 126A according to the second embodiment of the present invention. The fixing device 126A of the second embodiment has a stretching member 63 instead of the stretching member 3 (FIG. 2) of the fixing device 126 of the first embodiment.

Figure 10A:
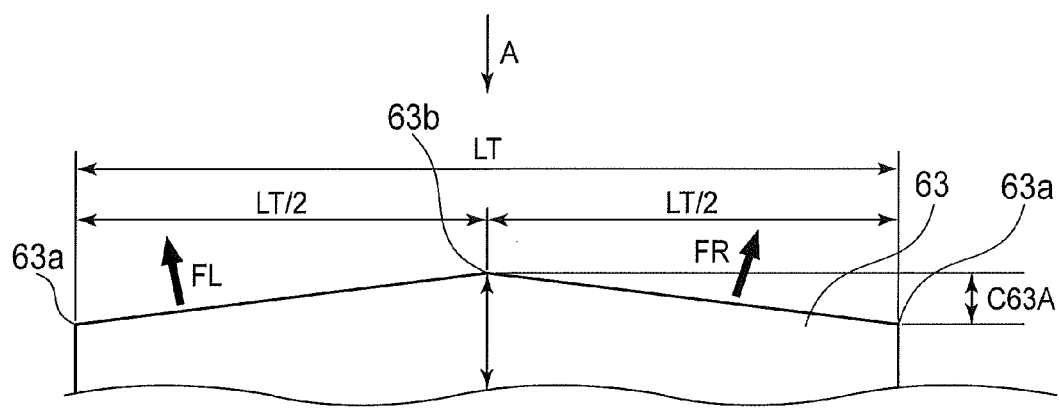
FIGS. 10A and 10B are plan views showing examples of an upstream end portion of a stretching member in a rotating direction of a fixing belt according to the second embodiment of the present invention.

FIG. 10A shows an example of a shape of an upstream end portion (indicated by a mark "X1" in FIG. 9) of the stretching member 63 in a rotating direction of the fixing belt 2, as seen in a direction shown by an arrow Y1 in FIG. 9 (i.e., as seen from the fixing belt 2). In FIG. 10A, a convex amount of the stretching member 63 (in this example, 2 mm) is illustrated in an exaggerated size. In other words, respective parts of the stretching member 63 are illustrated at different reduction ratios, in order to show that the stretching member 63 has a convex portion that protrudes toward an upstream side along the rotating direction (as shown by an arrow A in FIG. 9) of the fixing belt 2.

As shown in FIG. 10A, the upstream end portion of the stretching member 63 in the rotating direction of the fixing belt 2 has a shape such that a center portion 63b of the stretching member 63 in a widthwise direction protrudes with respect to each end portion 63a of the stretching member 63 by a amount (i.e., a convex amount) C63A. Therefore, a sliding distance of the fixing belt 2 along the surface of the stretching member 63 at the center portion 63b is longer than that at each end portion 63a by the convex amount C63A.

In FIG. 10A, the center portion 63b is defined as a portion distanced from the end portion 63a in the widthwise direction by a distance corresponding to a half (i.e., LT/2) of a width LT of the stretching member 63. Further, the upstream end portion of the stretching member 63 (in the rotating direction of the fixing belt 2) has a shape such that the sliding distance of the fixing belt 2 along the stretching member 63 linearly and gradually decreases from the center portion 63b toward either end portion 63a in the widthwise direction of the stretching member 63. In this regard, the widthwise direction of the stretching member 63 is parallel with the widthwise direction of the fixing belt 2.

Figure 10B:
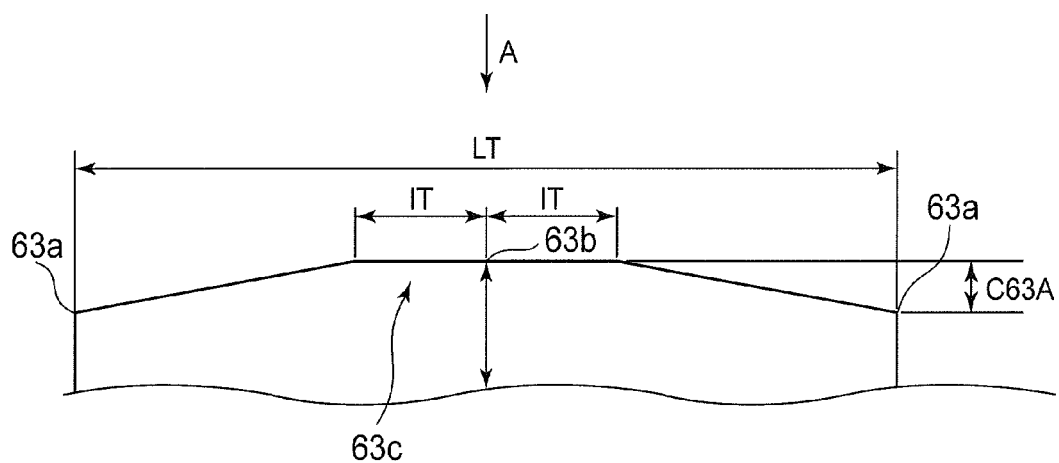

FIG. 10B shows another example of the shape of the upstream end portion of the stretching member 63. As shown in FIG. 10B, it is also possible that the upstream end portion of the stretching member 63 has a center region 63c extending a certain distance IT on each side from the center portion 63b in the widthwise direction. The center region 63c protrudes toward the upstream side along the rotating direction (shown by the arrow A) of the fixing belt 2. A sliding distance of the fixing belt 2 along the surface of the stretching member 63 is constant at the center region 63c, and straightly and gradually decreases from the center region 63c toward either end portion 63a.

In the examples shown in FIGS. 10A and 10B, the upstream end portion of the stretching member 63 has straight edges. However, it is also possible that the upstream end portion of the stretching member 63 has smoothly curved edges.

Figure 11A:
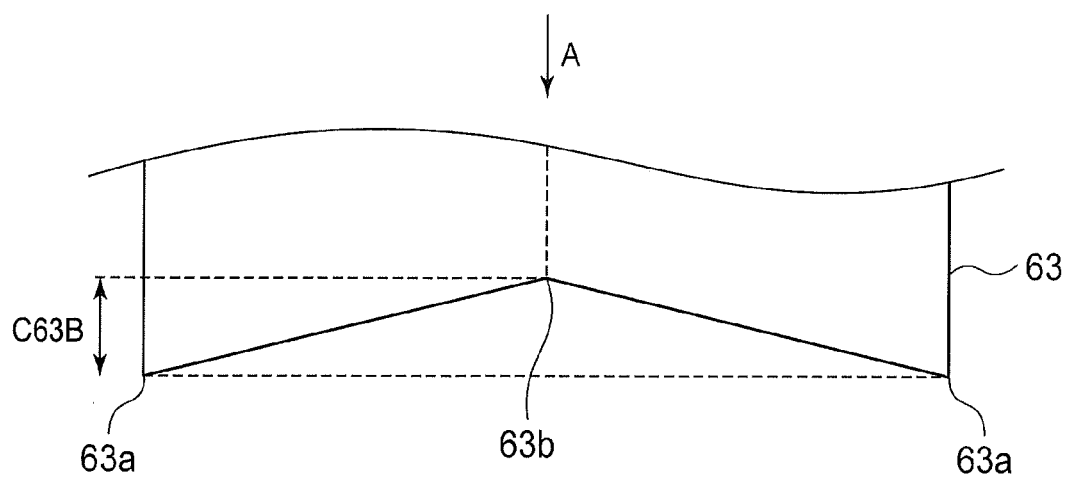
FIGS. 11A and 11B are plan views showing examples of a downstream end portion of the stretching member in the rotating direction of the fixing belt according to the second embodiment of the present invention.
Figure 11B:
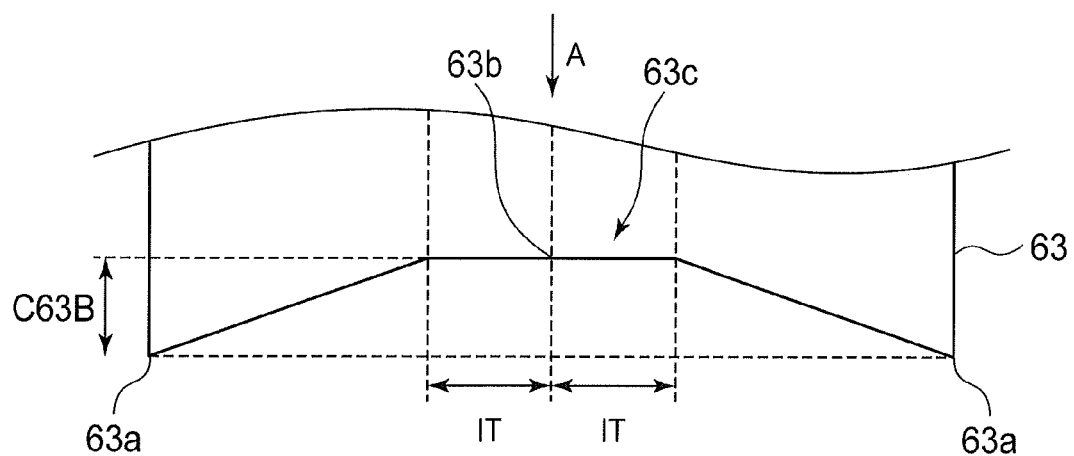

It is also possible that a downstream end portion of the stretching member 63 has a concave shape as shown in FIG. 11A or 11B for adjusting the sliding distance of the fixing belt 2 along the surface of the stretching member 63.

FIG. 11A shows an example of a shape of the downstream end portion (indicated by a mark "X2" in FIG. 9) of the stretching member 63 in the rotating direction of the fixing belt 2, as seen in a direction shown by an arrow Y2 in FIG. 9 (i.e., as seen from the fixing belt 2). In FIG. 11A, a concave amount of the stretching member 63 (in this example, 2 mm) is illustrated in an exaggerated size. In other words, respective parts of the stretching member 63 are illustrated at different reduction ratios, in order to show that the stretching member 63 has a concave portion which is recessed toward an upstream side along the rotating direction of the fixing belt 2.

In FIG. 11A, the upstream end portion of the stretching member 63 in the rotating direction of the fixing belt 2 has the concave shape which is recessed toward the upstream side along the rotating direction (shown by the arrow A) of the fixing belt by an amount (i.e., a concave amount) C63B. The sliding distance of the fixing belt 2 along the surface of the stretching member 63 straightly and gradually increases from the center portion 63b to either end portion 63a.

FIG. 11B shows another example of the shape of the downstream end portion of the stretching member 63. As shown in FIG. 11B, it is also possible that the downstream end portion of the stretching member 63 has a center region 63c extending a certain distance IT on each side from the center portion 63b in the widthwise direction. The center region 63c is recessed toward the upstream side along the rotating direction of the fixing belt 2 by the concave amount C63B. Therefore, a sliding distance of the fixing belt 2 along the surface of the stretching member 63 is constant at the center region 63c, and straightly and gradually increases from the center region 63c toward either end portion 63a.

In the examples shown in FIGS. 11A and 11B, the downstream end portion of the stretching member 63 has straight edges. However, it is also possible that the downstream end portion of the stretching member 63 has smoothly curved edges.

In the second embodiment, the upstream end portion and/or the downstream end portion of the stretching member 63 (in the rotating direction of the fixing belt 2) has the above described shapes so as to adjust the sliding distance of the fixing belt 2 along the stretching member 63 at the center portion 63b and at each end portion 63a. In the case where the upstream end portion has the convex shape (for example, as shown in FIG. 10A or 10B) and the downstream end portion has the concave shape (for example, as shown in FIG. 11A or 11B), the convex amount C63A and the concave amount C63B can be the same as each other or different from each other.

In a particular example, the difference between the sliding distance of the fixing belt 2 at the center portion 63b and the sliding distance of the fixing belt 2 at the end portion 63a is set to 2 mm.

<<Operation of Second Embodiment>>

A difference between operations of the image forming apparatus 100A of the second embodiment from the image forming apparatus 100 of the first embodiment will be described. Description will be made of a case where the upstream end portion of the stretching member 63 has the convex portion as shown in FIG. 10A but the downstream end portion of the stretching member 63 does not have the concave portion.

The fixing belt 2 is heated by a sliding movement of the fixing belt 2 along the stretching member 63. The sliding distance of the fixing belt 2 along the stretching member 63 at the center portion 63b is longer than at each end portion 63a by the convex amount C63A. Therefore, the fixing belt 2 is applied with forces as shown by arrows FL and FR in FIG. 10A. That is, the fixing belt 2 is pulled from the center portion 63b toward either end portion 63a.

<<Advantages of Second Embodiment>>

The second embodiment provides the following advantages in addition to the advantages of the first embodiment.

According to the second embodiment, the upstream end portion and/or the downstream end portion of the stretching member 63 (in the rotating direction of the fixing belt 2) has the shapes so as to adjust the sliding distance of the fixing member 2 along the stretching member 63 at the center portion 63b and at each end portion 63a. Therefore, the fixing belt 2 is applied with the forces by the stretching member 63, and is pulled from the center portion 63b toward either end portion 63a. Accordingly, the rotation (movement) of the fixing belt 2 can be stabilized.

Further, it becomes possible to adjust a distribution of the sliding distance of the fixing belt 2 (i.e., a distance by which the fixing belt 2 contacts the stretching member 3) in the widthwise direction. Therefore, a distribution of the temperature of the fixing belt 2 in the widthwise direction can be adjusted.

The present invention is not limited to the above described embodiments, and various modifications can be made thereto.

In the above described embodiments, the image forming apparatus has been described as the printer. However, the image forming apparatus of the present invention is also applicable to, for example, a copier, a multifunction peripheral, a facsimile machine or the like.

Further, the components of the image forming apparatus of the present invention are not limited to those described in the first and second embodiments. For example, in the first and second embodiment, description has been made to the image forming apparatus configured to form a toner image on the medium by means of the LED head. However, the image forming apparatus can also be configured to form a toner image using other means. Further, in the first and second embodiment, description has been made to the image forming apparatus having a medium cassette for feeding the medium. However, the image forming apparatus can also be configured to feed the medium using other means.

While the preferred embodiments of the present invention have been illustrated in detail, it should be apparent that modifications and improvements may be made to the invention without departing from the spirit and scope of the invention as described in the following claims.

What is claimed is:

1. A belt unit comprising:
an endless belt member having a substantially constant thickness, a circumferential length of the belt member at a center portion thereof in a widthwise direction of the belt member being shorter than a circumferential length of the belt member at an end portion thereof in the widthwise direction of the belt member;
a first roller provided on an inner circumferential surface side of the belt member, the first roller having a crown shape such that an outer diameter of the first roller at a center portion thereof in an axial direction of the first roller is larger than an outer diameter of the first roller at an end portion thereof in the axial direction of the first roller;
a stretching member provided on the inner circumferential surface side of the belt member, the stretching member being configured to stretch the belt member, and
a biasing member that biases the stretching member in a direction in which the stretching member applies tension to the belt member.

2. The belt unit according to claim 1, further comprising a second roller provided so as to face the first roller, wherein the first roller and the second roller sandwich the belt member therebetween, and
wherein the second roller presses the belt member against the first roller.

3. The belt unit according to claim 1, wherein the belt member has an inclined portion extending from the end portion in the widthwise direction of the belt member toward the center portion thereof in the widthwise direction of the belt member.

4. The belt unit according to claim 1, wherein the belt member has a part facing away from the stretching member, and the part has an inclined portion extending from the end portion of the belt member in the widthwise direction of the belt member toward the center portion of the belt in the widthwise direction of the belt member.

5. The belt unit according to claim 3, wherein the belt member has an apex on the inner side of the belt member, and the apex is located at substantially the center portion of the belt in the widthwise direction of the belt member.

6. The belt unit according to claim 1, wherein a difference between an inner diameter of the belt member at the center portion of the belt member and an inner diameter of the belt member at the end portion of the belt member is in a range from 0.01 mm to 0.2 mm.

7. The belt unit according to claim 1, wherein a difference between an inner diameter of the belt member at the end portion of the belt member and an inner diameter of the belt member at the center portion of the belt member is in a range from 0.003% to 0.063% with respect to a width of the belt member in the widthwise direction.

8. The belt unit according to claim 1, wherein the stretching member has a contact portion that contacts the inner circumferential surface of the belt member, and
wherein the contact portion extends in a direction substantially parallel with an axis of the first roller.

9. The belt unit according to claim 1, wherein the belt member is restrained by a contact portion of the stretching member biased by the biasing member.

10. The belt unit according to claim 1, wherein an upstream end portion of the stretching member in a moving direction of them belt member has a convex shape protruding toward an upstream side along the moving direction of the belt member.

11. The belt unit according to claim 1, wherein a downstream end portion of the stretching member in a moving direction of the belt member has a concave shape recessed toward an upstream side along the moving direction of the belt member.

12. A fixing device for fixing a developer image to a medium, the fixing device comprising:
the belt unit according to claim 1;
a heating member for heating the stretching member, and a second roller provided so as to face the first roller,
wherein the second roller presses the belt member against the first roller.

13. The fixing device according to claim 12, further comprising a pressing member provided on an upstream side of the first roller in a moving direction of the belt member,
wherein the pressing member presses the medium against the belt member.

14. The fixing device according to claim 12, further comprising a pressing member provided on an upstream side of the first roller in a moving direction of the belt member,
wherein a center portion of the pressing member in the widthwise direction of the belt member protrudes toward the belt member with respect to an end portion of the pressing member in the widthwise direction of the belt member.

15. An image forming apparatus comprising a fixing device for fixing a developer image to a medium, the image forming apparatus comprising the belt unit according to claim 1.

16. The belt unit according to claim 1, further comprising a second roller pressed against the first roller via the belt member so as to form a nip portion between the belt member and the first roller,
wherein the stretching member is disposed on an opposite side to the nip portion on the inner circumferential surface side of the belt member, the stretching member having a first surface portion substantially linearly extending in the axial direction of the first roller to make sliding contact with the inner circumferential surface of the belt member substantially linearly along the axial direction, and
further wherein the second roller has a second surface portion substantially linearly extending in the axial direction to make sliding contact with an outer circumferential surface of the belt member substantially linearly along the axial direction.

17. The belt unit according to claim 16, further comprising a pressing member provided on the inner circumferential surface side of the belt member, the pressing member being located downstream of the first roller in a moving direction of the belt member,
wherein the pressing member is pressed against the second roller via the belt member, and
further wherein the pressing member has a third surface portion having a convex shape such that a center portion of the pressing member in the axial direction of the first roller protrudes toward the inner circumferential surface side of the belt member with respect to an end portion of the pressing member in the axial direction.

* * * * *